US012606082B2

(12) United States Patent
Massa

(10) Patent No.: US 12,606,082 B2
(45) Date of Patent: Apr. 21, 2026

(54) DYNAMIC LOAD MANAGEMENT FOR LIGHTING SYSTEM

(71) Applicant: HiViz Lighting, Inc., Hendersonville, NC (US)

(72) Inventor: Samuel T. Massa, Hendersonville, NC (US)

(73) Assignee: HiViz Lighting, Inc., Hendersonville, NC (US)

( * ) Notice: Subject to any disclaimer, the term of this patent is extended or adjusted under 35 U.S.C. 154(b) by 195 days.

(21) Appl. No.: 18/303,995

(22) Filed: Apr. 20, 2023

(65) Prior Publication Data

US 2023/0339419 A1 Oct. 26, 2023

Related U.S. Application Data

(60) Provisional application No. 63/333,706, filed on Apr. 22, 2022.

(51) Int. Cl.
*B60Q 1/04* (2006.01)
*B60Q 1/14* (2006.01)
*B60Q 1/46* (2006.01)
*B60R 16/03* (2006.01)

(52) U.S. Cl.
CPC ................ *B60Q 1/14* (2013.01); *B60Q 1/46* (2013.01); *B60R 16/03* (2013.01)

(58) Field of Classification Search
CPC .......... B60Q 1/04; B60Q 1/0408; B60Q 1/06; B60Q 1/14; B60Q 1/46; B60Q 2300/00; B60Q 2300/54; B60R 16/03
See application file for complete search history.

(56) References Cited

U.S. PATENT DOCUMENTS

| | | | |
|---|---|---|---|
| 9,139,130 B2 | 9/2015 | Wolfe | |
| 11,519,345 B2* | 12/2022 | Gysi | F02D 19/0647 |
| 2013/0239845 A1* | 9/2013 | Frazier | B61C 17/02 105/27 |
| 2017/0051692 A1* | 2/2017 | Zhang | F02D 29/06 |
| 2020/0128592 A1 | 4/2020 | Jackson et al. | |
| 2021/0213873 A1 | 7/2021 | Martin et al. | |
| 2022/0289100 A1* | 9/2022 | Wendorff | B60Q 1/0076 |

OTHER PUBLICATIONS

Non-Final Office Action received Apr. 9, 2025, issued in corresponding U.S. Appl. No. 18/306,023, filed Apr. 21, 2023, 49 pages.

* cited by examiner

*Primary Examiner* — Thai Pham

(74) *Attorney, Agent, or Firm* — CHRISTENSEN O'CONNOR JOHNSON KINDNESS PLLC

(57) ABSTRACT

A lighting system including one or more loads and one or more load managers electrically coupled to or embedded in the one or more loads. The one or more load managers are configured to measure an input voltage from the one or more loads, determine if the input voltage is below a minimum voltage for the lighting system, when the input voltage is below the minimum voltage threshold, adjust a power level of the lighting system, and when the input voltage is above a minimum voltage, store the power level as an operational power for the lighting system.

20 Claims, 6 Drawing Sheets

*2000*

TURN ON
LIGHTING SYSTEM ~220

MEASURE INPUT
VOLTAGE FROM
PLURALITY OF LOADS ~225

*230*

INPUT
VOLTAGE BELOW
MINIMUM VOLTAGE
THRESHOLD
?

*235* ~ REDUCE POWER
LEVEL OF PLURALITY
OF LOADS

YES

NO

STORE POWER LEVEL
AS OPERATIONAL
POWER LEVEL FOR
LIGHTING SYSTEM ~240

RESTART
LIGHTING SYSTEM ~245

AUTOMATICALLY
APPLY OPERATIONAL
POWER LEVEL ~250

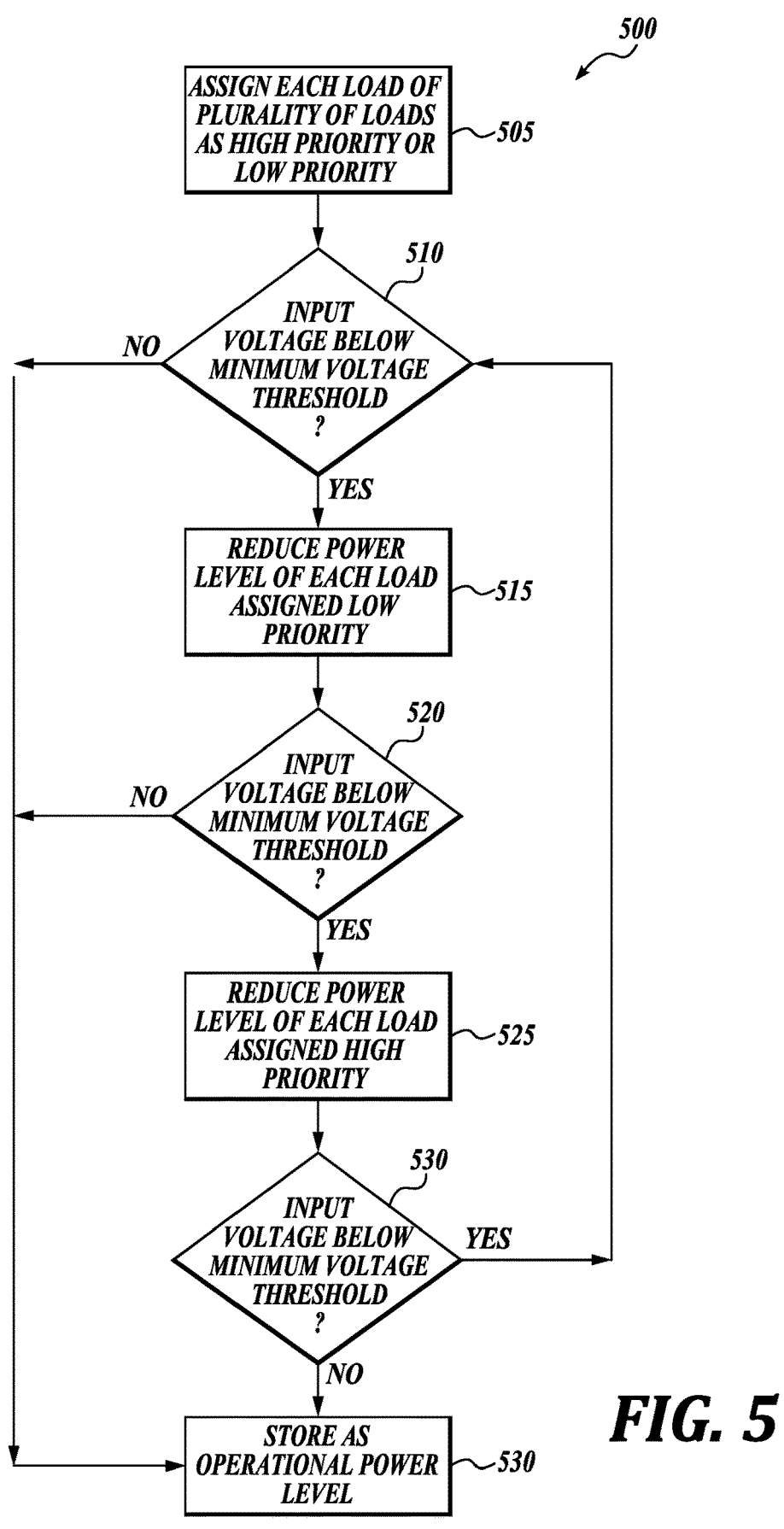

*500*

ASSIGN EACH LOAD OF PLURALITY OF LOADS AS HIGH PRIORITY OR LOW PRIORITY ~505

510
INPUT VOLTAGE BELOW MINIMUM VOLTAGE THRESHOLD ?

NO

YES

REDUCE POWER LEVEL OF EACH LOAD ASSIGNED LOW PRIORITY ~515

520
INPUT VOLTAGE BELOW MINIMUM VOLTAGE THRESHOLD ?

NO

YES

REDUCE POWER LEVEL OF EACH LOAD ASSIGNED HIGH PRIORITY ~525

530
INPUT VOLTAGE BELOW MINIMUM VOLTAGE THRESHOLD ?

YES

NO

STORE AS OPERATIONAL POWER LEVEL ~530

TURN ON
LIGHTING SYSTEM — *605*

MEASURE INPUT
*610* — VOLTAGE FROM
PLURALITY OF LOADS

*615*
INPUT
VOLTAGE BELOW
MINIMUM VOLTAGE
THRESHOLD
?

NO

YES

*620*
LIGHTING
SYSTEM AT MINIMUM
ALLOWABLE POWER
LEVEL
?

NO

*625*
REDUCE POWER
LEVEL OF LIGHTING
SYSTEM

YES

SAVE POWER LEVEL
AS OPERATIONAL
POWER LEVEL FOR
LIGHTING SYSTEM — *630*

DYNAMIC LOAD MANAGEMENT FOR LIGHTING SYSTEM

CROSS-REFERENCE TO RELATED APPLICATION

This application claims the benefit of U.S. Provisional Application No. 63/333,706 filed Apr. 22, 2022, the entire disclosure of which is hereby incorporated by reference.

BACKGROUND

Firetrucks and other vehicles often include a load manager. This device prevents user-selected loads from exceeding the capacity of an electrical system and causing damage. When emergency vehicles are built, often times the total number of DC electrical loads exceeds the capacity of the alternator and battery system. Generally, only some loads are used at any given time, and it is not likely that every DC load will be "on" at the same time.

If all loads are switched on, and the electrical system is not large enough to handle the load that exceeds its charging or reserve capacity, eventually the battery system voltage drops to the point where the loads no longer work, and the system begins to fail, or loads attached to the system stop functioning properly due to power starvation.

To combat this, at the time of manufacturing, apparatus manufacturers require customers to rate their preference of loads in "groups" of importance. As voltage drops, the vehicle electrical system sheds the loads or disconnects the loads based on the group and priority on the apparatus. The largest loads are scene lights, heating, ventilation, and air conditioning (HVAC) systems, and warning lights. Regulations may require minimum warning light functionality, so often these loads are grouped as "do not shed" loads. This may result in the system failing as the loads exceed the capacity of the charging system and batteries. In emergency vehicles, system failure could have very serious or even lethal consequences, as lighting and operation of the emergency vehicle allows rescue personnel to perform their job function.

Further, in emergency vehicles, the loads must be appropriately sized to match the electrical conductors used to feed the various loads in the system. The length and gauge of the conductor are the two primary variables which can be adjusted. In general, the longer the conductor, the lower the gauge of the cable needs to be for any given load. Similarly, for a constant length of conductor, the higher the power of the load, the larger the conductor needs to be. Incorrectly sized conductors can cause voltage drop under load, which causes the wire to heat up, and can potentially cause a fire hazard. Lighting systems can draw a lot of power. When they are installed on long vehicles (like fire trucks), or when they are installed a long way from the source, if any of the math in the calculation for choice of wire gauge is incorrect, excessive voltage drop can occur. Modern lighting systems have microcontrollers or other sensitive electronics which don't work well in excessive voltage drop conditions.

Accordingly, systems and methods for managing loads are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is a lighting system including a plurality of loads, and one or more load managers electrically coupled to or embedded in the plurality of loads. In some embodiments, the one or more load managers configured to measure an input voltage at the plurality of loads, determine if the input voltage is below a minimum voltage for the lighting system, when the input voltage is below the minimum voltage threshold, adjust a power level of the lighting system, and when the input voltage is above a minimum voltage, store the power level as an operational power for the lighting system.

Also disclosed herein is a method of dynamically managing a load of a lighting system of a vehicle. In some embodiments, the method includes measuring an input voltage from a plurality of loads on the vehicle when the lighting system is turned on and one or more loads of the plurality of loads are applied, determining if the input voltage is below a minimum voltage for the lighting system, when the input voltage is below the minimum voltage threshold, reducing a power level of the lighting system, and when the input voltage is above a minimum voltage, storing the power level as an operational power level for the lighting system.

Also disclosed herein is a system of measuring a voltage drop under load. In some embodiments, the system includes one or more load managers coupled to or embedded in a plurality of loads. In some embodiments, the one or more load managers are configured to measure a startup voltage of the lighting system, where the startup voltage is a voltage of the lighting system before one or more loads of the plurality of loads are applied, calculate a voltage drop under load based on the difference between the startup voltage and the input voltage, and when the voltage drop under load is greater than or equal to a voltage drop threshold, adjust the power level of the plurality of loads until the voltage drop under load is less than the voltage drop threshold.

Further disclosed herein is a method of measuring and adjusting a voltage drop under load, the method including measuring a startup voltage of the lighting system, where the startup voltage is a voltage of the lighting system before one or more loads of the plurality of loads are applied, calculating a voltage drop under load based on the difference between the startup voltage and an input voltage, and when the voltage drop under load is greater than or equal to the voltage drop threshold, adjusting the power level of the plurality of loads until the voltage drop under load is less than voltage drop threshold.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is another method of dynamically managing a load of a lighting system based on voltage, in accordance with the present technology.

DETAILED DESCRIPTION

While illustrative embodiments have been illustrated and described, it will be appreciated that various changes can be made therein without departing from the spirit and scope of the invention.

Disclosed herein are systems and methods for dynamically managing load of a lighting system. In some embodiments, the lighting system is integrated into a vehicle. In some embodiments, one or more load managers of the lighting system are configured to continuously monitor an input voltage of the lighting system, based on one or more loads coupled to the lighting system, and determine if the input voltage is below a predetermined minimum voltage of the lighting system. When it is determined that the input voltage is below the minimum voltage, the one or more load managers dynamically adjust a power level of the one or more loads. Further, in some embodiments, the one or more load managers are configured to measure a startup voltage of the lighting system. The one or more load managers may compare the startup voltage with the input voltage to determine a voltage drop under load. When the voltage drop under load exceeds a predetermined threshold, the one or more load managers may further adjust the power level of the one or more loads, until the voltage drop under load is below the predetermined threshold. In this manner, the lighting system may automatically adjust the power level of the one or more loads to prevent the lighting system from unexpectedly turning off, exceeding its load, or flickering.

Figure 1:
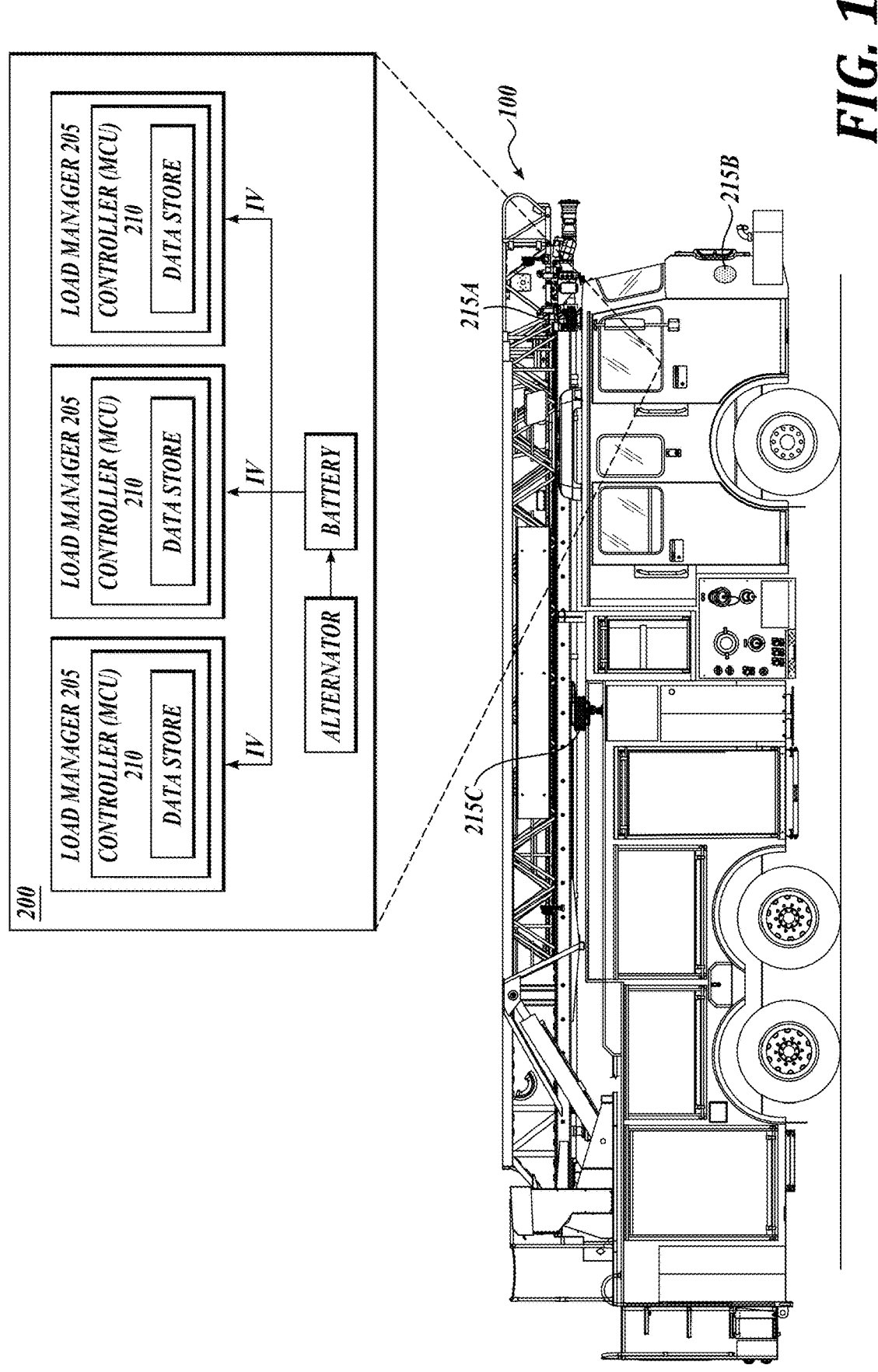
FIG. 1 is an example lighting system having one or more load managers, in accordance with the present technology.

FIG. 1 is an example lighting system 200 having one or more load managers 205, in accordance with the present technology. The lighting system 200 may include one or more load managers 205 having a controller 210, and a one or more loads 215A, 215B, 215C electrically coupled to the one or more load managers 205.

In some embodiments, the lighting system 200 is integrated into a vehicle 100. Although vehicle 100 is illustrated as a fire truck, it should be understood that the lighting system 200 may be integrated into any kind of vehicle, such as a car, truck, boat, plane, train, or the like.

In some embodiments, the plurality of loads 215A, 215B, 215C are located on or integrated into the vehicle 100. In some embodiments, the one or more loads may be referred to as a plurality of loads 215A, 215B, 215C include warning lights 215A, headlights 215B, and scene lights 215C. Any number of loads may be in the plurality of loads 215A, 215B, 215C, including a single load; the illustrated plurality of loads 215A, 215B, 215C are merely representative. In some embodiments, the plurality of loads 215A, 215B, 215C are selected from warning lights, scene lights, a heating, ventilation, and air conditioning (HVAC) system, one or more brakes, a transmission, one or more headlights, one or more dome lights, one or more compartment lights, one or more undercarriage lights, one or more sirens, one or more radio chargers, or a combination thereof. It should be understood that the plurality of loads 215A, 215B, 215C could include any or all of the loads described herein. In some embodiments, the plurality of loads 215A, 215B, 215C are electrically coupled to the one or more load managers 205 with a wired or wireless connection. In some embodiments, the wireless connection is Bluetooth, Bluetooth low energy (BLE), controller area network (CAN), local area network (LAN), Wi-Fi, or the like.

In some embodiments, the lighting system 200 includes a one or more load managers 205. In some embodiments, the one or more load managers 205 include a controller 210. In some embodiments, the controller 210 is a microcontroller unit (MCU). In some embodiments, the one or more load managers 205 may be located on or inside the vehicle 100. In some embodiments, the one or more load managers 205 may be remote from the vehicle 100. In some embodiments, each load of the plurality of loads 215A, 215B, 215C have a separate load manager 205. In such embodiments, each load of the plurality of loads 215A, 215B, 215C adjust independently of one another, based on signals sent around a vehicle 100 and an input voltage sensed, as described in detail herein. In some embodiments, the one or more load managers 205 are external to the one or more loads 215A, 215B, 215C. In some embodiments, the one or more load managers 205 are embedded or otherwise incorporated into the one or more loads 215A, 215B, 215C. In some embodiments, the one or more load managers 205 are integrated into each load of the one or more loads 215A, 215B, 215C.

Accordingly, in some embodiments, the system includes a plurality of loads 215A, 215B, 215C each having a load manager 205, where each load manager 205 is configured to sense the input voltage to its respective load and adjust the input voltage of the respective load accordingly. As described herein, when referring to "the load manager" it should be understood that this includes both a single load manager for the entire lighting system, an independent load manager for each load or for some of the loads of the plurality of loads, or a combination thereof.

In operation, the lighting system 200 is turned on. As described herein, the lighting system 200 is considered "turned on" on startup of the lighting system 200. In some embodiments, the lighting system 200 is turned on automatically when the vehicle 100 is turned on. In some embodiments, the lighting system 200 is turned on independently of the vehicle 100 being turned on. In some embodiments, the lighting system 200 is turned on manually by a user of the lighting system 200, the vehicle 100, or both.

In some embodiments, an input voltage to the lighting system 200 is measured. The input voltage as described herein is the voltage of one or more loads of the plurality of loads 215A, 215B, 215C that are in use (or applied) in the lighting system 200. For example, the input voltage may be the voltage to the warning lights 215A, the scene lights 215B, and the scene lights 215C when all three are turned on simultaneously. As described herein, the input voltage may be measured multiple times. For example, the input voltage may be measured continuously as the lighting system 200 is in operation. In some embodiments, the input voltage is measured periodically. In some embodiments, the input voltage is measured every time a load of the plurality of loads 215A, 215B, 215C is applied or turned off. In some embodiments, the input voltage is recorded by the one or more load managers 205.

In some embodiments, the input volage is compared with a minimum voltage of the lighting system 200. In some embodiments, the minimum voltage of the lighting system 200 is preset by the one or more load managers 205 or controller 210. In some embodiments, the minimum voltage of the lighting system is determined by one or more regulations, the manufacturer of the lighting system 200, or a user preference of a user of the lighting system 200. In some embodiments, the minimum voltage is determined by National Fire Protection Association (NFPA) regulations. In some embodiments, the minimum voltage of the lighting system 200 is determined based on a capacity of an alternator and battery system of the lighting system 200 or the vehicle 100.

If the input voltage is below a minimum voltage of the lighting system 200, the one or more load managers 205 may reduce the power level of the plurality of loads 215A, 215B, 215C. In some embodiments, the power level of the plurality of loads 215A, 215B, 215C In some embodiments, the power level of the plurality of loads 215A, 215B, 215C is a current, a drive, a battery consumption, an intensity, a brightness, or the like. For example, for an HVAC system, the power level may be an intensity of heat or air-conditioning, a temperature of the heat or air-conditioning, a fan speed, a compressor speed, or the like. As another example, for a warning light or scene light, the power level may be a brightness or intensity of the light emitted by the warning light. In some embodiments, the power level of each load of the plurality of loads 215A, 215B, 215C may be adjusted by the same amount, such as by 2 amps. In some embodiments, the power level of each load of the plurality of loads 215A, 215B, 215C may be adjusted by the same proportion, such as by 10%.

In some embodiments, the power level of each load of the plurality of loads 215A, 215B, 215C may be adjusted based on a priority of each load. For example, in some embodiments, the one or more load managers 205 may assign each load of the plurality of loads 215A, 215B, 215C a high priority or a low priority. In some embodiments, the one or more load managers may assign any number of priorities, such as a first priority, a second priority, a third priority, and a last priority. In such embodiments, when the input voltage is below the minimum voltage, the one or more load managers 205 may reduce the power level of each load assigned the low priority (or lower priority) by 10% and the power level of each load assigned a high priority (or higher priority) by 5%. In some embodiments, the one or more load managers 205 may reduce the power level each load assigned a low priority, measure the input voltage again, and only when the input voltage is still below the minimum voltage, reduce the power level of each load assigned a high priority.

In some embodiments, the one or more load managers 205 may further group the plurality of loads 215A, 215B, 215C into a plurality of priority level groups. In such embodiments, the power level of each load of the plurality of loads 215A, 215B, 215C assigned to a lower priority group is adjusted or reduced by the same amount and at the same time as all loads of the plurality of loads 215A, 215B, 215C assigned to the lower priority group. In the same manner, the power level of each load of the plurality of loads 215A, 215B, 215C assigned to a higher priority group is adjusted or reduced by the same amount and at the same time as all loads of the plurality of loads 215A, 215B, 215C assigned to the higher priority group.

In some embodiments, the power level for each load of the plurality of loads 215A, 215B, 215C is reduced based on how much lower the input voltage is than the minimum voltage threshold. For example, in a system having a minimum voltage threshold of 11.9V or less, the power level of a load may be reduced by a percentage for every decimal percent under the minimum voltage threshold, as shown in Table 1.

TABLE 1

| Voltage | Brightness |
| --- | --- |
| 12.1+ V | 100% |
| 12 V | 100% |
| 11.9 V | 95% |
| 11.8 V | 90% |
| 11.7 V | 90% |
| 11.6 V | 90% |
| 11.5 V | 80% |
| 11.4 V | 80% |
| 11.3 V | 80% |
| 11.2 V | 70% |
| 11.1 V | 70% |
| 11 V | 70% |
| 10.9 V | 65% |
| 10.8 V | 60% |
| 10.7 V | 55% |
| 10.6 V | 50% |
| 10.5 V | 45% |
| 10.4 V | 40% |
| 10.3 V | 35% |
| 10.2 V | 30% |

As shown in Table 1, in some embodiments, the percentage of power level (here brightness) may be reduced logarithmically as the input voltage becomes smaller (and therefore farther from the minimum voltage threshold). It should be understood that the brightness values in Table 1 correspond to a maximum brightness allowed by the load. It should also be understood that Table 1 is merely representative, and the power level of each load of the plurality of loads 215A, 215B, 215C may be reduced in any manner, such as exponentially or algorithmically.

In some embodiments, the one or more load managers 205 may reduce the power level of each load of the plurality of loads 215A, 215B, 215C based on which loads are actively turned on.

In some embodiments, the input voltage is measured again after adjusting the power level of the plurality of loads 215A, 215B, 215C. Once the input voltage is above the minimum voltage of the lighting system 200, the one or more load managers 205 may store the power level as an operational power for the lighting system 200, as described herein.

In some embodiments, the vehicle 100 includes a battery and an alternator. In some embodiments, after the power level of the plurality of loads is adjusted, the alternator will be able to compensate for the power required to operate the system and a voltage of the battery will return to an operational range. In some embodiments, as the voltage to the plurality of loads 215A, 215B, 215C increases, the input voltage to the lighting system will be re-measured. In such embodiments, the power level of the plurality of loads 215A, 215B, 215C may be adjusted in response to the re-measured input voltage. In this manner, the power level of the plurality of loads 215A, 215B, 215C may be increased to take advantage of the increased voltage.

In some embodiments, after the lighting system 200 is turned on, the controller 210 boots up. In some embodiments, the one or more load managers 205 measure a startup voltage of the system. The startup voltage may be the voltage of the lighting system 200 before any load of the plurality of loads 215A, 215B, 215C is applied. The startup voltage may also be the voltage of the lighting system 200 after a first one or more loads of the plurality of loads 215A, 215B, 215C is applied, but before a second one or more loads of the plurality of loads 215A, 215B, 215C is applied. For example, the startup voltage may be the voltage of the lighting system 200 when just the headlights 215B are turned on. In such an example, the input voltage could be the voltage of the lighting system 200 when the headlights 215B and the warning lights 215A and the scene lights 215C are turned on.

In some embodiments, the controller 210 includes firmware including a maximum allowed voltage drop under load. In some embodiments, the maximum allowed voltage drop under load is greater than or equal to 10%. In some embodiments, the maximum allowed voltage drop under load is greater or less than 10%. In some embodiments, the maximum allowed voltage drop under load ranges from about 2% to about 15%.

In some operation, the controller 210 compares the startup voltage and the input voltage to determine the voltage drop under load for the lighting system 200. In some embodiments, the controller 210 determines the voltage drop under load as a fraction or a percentage. In some embodiments, when the voltage drop under load exceeds the allowable voltage drop under load, the power level of the plurality of loads 215A, 215B, 215C is adjusted by the controller 210. In some embodiments, the power level is further adjusted after adjusting for the minimum voltage of the lighting system 200 as described above. In some embodiments, the adjusting of the power level based on the minimum voltage threshold is omitted.

In some embodiments, when the voltage drop under load exceeds 10%, the controller 210 adjusts the power level of the plurality of loads 215A, 215B, 215C. In some embodiments, the power level of each load of the plurality of loads 215A, 215B, 215C may be adjusted by the same amount, such as by 2 amps. In some embodiments, the power level of each load of the plurality of loads 215A, 215B, 215C may be adjusted by the same proportion, such as by 10%. In some embodiments, the power level of each load of the plurality of loads 215A, 215B, 215C may be adjusted based on a priority of each load. For example, in some embodiments, the one or more load managers 205 may assign each load of the plurality of loads 215A, 215B, 215C a high priority or a low priority. In such embodiments, when the voltage drop under load exceeds the voltage drop threshold, the one or more load managers 205 may reduce the power level of each load assigned a low priority by 10% and the power level of each load assigned a high priority by 5%. In some embodiments, the one or more load managers 205 may reduce the power level of each load assigned a low priority, measure the input voltage again, and only when the voltage drop under load still exceeds the voltage drop under load threshold, reduce the power level of each load assigned a high priority. In some embodiments, the one or more load managers 205 may reduce the power level of each load of the plurality of loads 215A, 215B, 215C based on which loads are actively turned on.

In some embodiments, the one or more load managers 205 may further group the plurality of loads 215A, 215B, 215C into a plurality of priority level groups. In such embodiments, the power level of each load of the plurality of loads 215A, 215B, 215C assigned to a lower priority group is adjusted or reduced by the same amount and at the same time as all loads of the plurality of loads 215A, 215B, 215C assigned to the lower priority group. In the same manner, the power level of each load of the plurality of loads 215A, 215B, 215C assigned to a higher priority group is adjusted or reduced by the same amount and at the same time as all loads of the plurality of loads 215A, 215B, 215C assigned to the higher priority group.

In some embodiments, the input voltage is measured again after adjusting the power level of the plurality of loads

215A, 215B, 215C. Once the voltage drop under load does not exceed the voltage drop threshold, the one or more load managers 205 may store the adjusted power level for each load as the operational level for the lighting system 200, as described herein. In some embodiments, the operational power level is based solely on the voltage drop under load measurement of the lighting system. In some embodiments, the power level of the plurality of loads 215A, 215B, 215C may be adjusted in a similar manner as shown in Table 1. That is, in some embodiments, the power level may be adjusted exponentially, logarithmically, or algorithmically based on how much the voltage drop under load of the lighting system 200 exceeds the voltage drop threshold.

In some embodiments, the voltage drop under load threshold refines the previously stored operational power level based on the minimum voltage threshold. In such embodiments, the one or more load managers 205 may first determine if the lighting system 200 is below the minimum voltage threshold, adjust the power level of the plurality of loads 215A, 215B, 215C until the minimum voltage threshold has been met, store the operational power mode and then measure the voltage drop, further adjust the power level of the plurality of loads 215A, 215B, 215C and adjust the stored operational power mode. This can also be done in the opposite order, where the voltage drop is adjusted before the minimum voltage. In some embodiments, both the voltage drop threshold and the minimum voltage threshold are monitored as the lighting system 200 is operated, so that the one or more load managers can adjust the power level of the plurality of loads 215A, 215B, 215C in real time to ensure that both thresholds are appropriately met.

Figure 2:
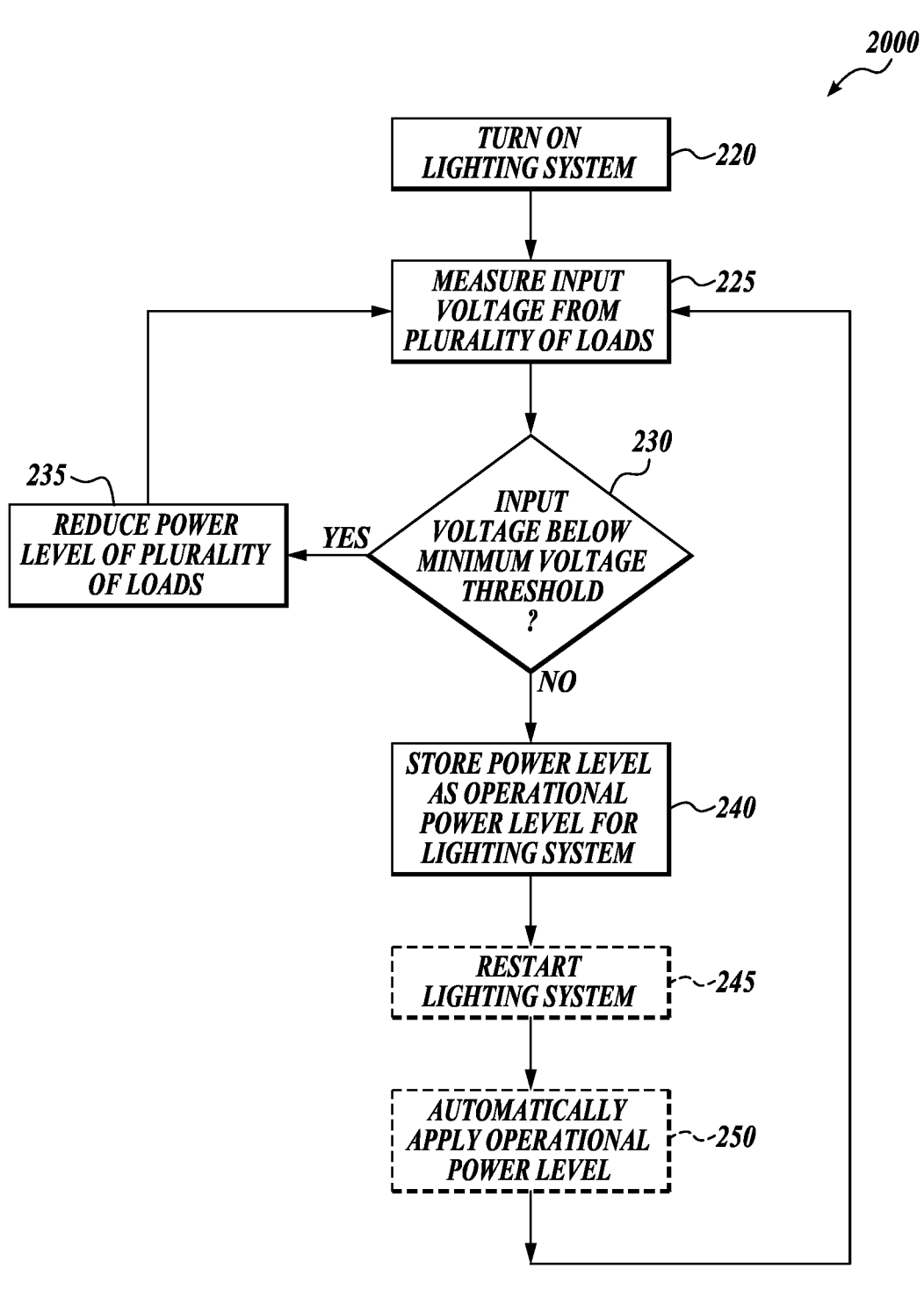
FIG. 2 is a method of dynamically managing a load of a lighting system based on voltage, in accordance with the present technology.

FIG. 2 is a method 2000 of dynamically managing a load of a lighting system based on voltage, in accordance with the present technology.

In process block 220, a lighting system is turned on. The lighting system may be lighting system 200 of FIG. 1. In some embodiments, the lighting system is integrated with a vehicle, such as shown in FIG. 1. In some embodiments, the lighting system is turned on automatically with the vehicle. In some embodiments, the lighting system is turned on with manual input, such as by a user. In some embodiments, the lighting system is turned on independently of the vehicle.

In block 225, an input voltage of the lighting system is measured. In some embodiments, the input voltage is determined based on a plurality of loads (such as plurality of loads 215A, 215B, 215C of FIG. 1). In some embodiments, one or more loads of the plurality of loads are turned on or applied when the input voltage is measured.

In decision block 230, it is determined whether the input voltage is below a minimum voltage of the lighting system. In some embodiments, the minimum voltage is predetermined by one or more regulations, the manufacturer of the lighting system or vehicle, or the personal preference of a user of the lighting system or vehicle. In some embodiments, the minimum voltage is hard coded into one or more load managers (such as one or more load managers 205) or a controller (such as controller 210). In some embodiments, the minimum voltage is determined based on the capacity of a battery system, alternator system, or a combination thereof of the vehicle or lighting system. When the input voltage is below the minimum voltage threshold, the method proceeds to block 235.

In block 235, a power level of the plurality of loads are reduced or otherwise adjusted. In some embodiments, the power level of the plurality of loads is a brightness, an intensity, a battery consumption, fan speed, compressor speed, or the like. In some embodiments, such as described herein, the power level of each load of the plurality of loads is reduced or adjusted by the same amount or the same proportion. The power level of the plurality of loads may be reduced or adjusted through any of the mechanisms described herein.

After the power level of the plurality of loads has been reduced, the method 2000 returns to block 225, where the input voltage of the plurality of loads is re-measured.

Returning to decision block 230, when it is determined that the input voltage is not below a minimum voltage threshold, the method 2000 proceeds to block 240.

In block 240, the power level of the plurality of loads is stored as an operational power level for the lighting system. The operational power level may be defined as the power level of the plurality of loads that is not below the minimum voltage threshold. In some embodiments, the input voltage from the plurality of loads is continually measured, measured periodically, or measured each time a load of the plurality of loads is turned on (applied) or turned off. In this manner, the operational power level of the lighting system changes depending on how many loads of the plurality of loads are turned on. In this manner, the one or more load managers may store multiple operational power levels depending on the loads currently applied. For example, the one or more load managers may store a first operational power level of the lighting system when the HVAC system, scene lights, and warning lights are turned on, and a second operational power level of the lighting system when just the HVAC system is turned on.

Optionally, in block 245, the lighting system is restarted. In some embodiments, the lighting system may automatically restart. In some embodiments, the lighting system may be manually restarted, such as by a user turning off the lighting system and then turning the lighting system back on. Any amount of time may elapse between block 240 and block 245. In some embodiments, any amount of time may elapse between the lighting system being turned off and the lighting system being turned on.

Optionally, in block 250, the operational power level (or operational power levels) is automatically applied to the lighting system. For example, for a lighting system having two operational power levels as described above (a first operational power level when the HVAC system, scene lights, and warning lights are turned on, and a second operational power level when just the HVAC system is turned on) the one or more load managers may automatically apply whichever operational power level is appropriate based on the number of and type of loads currently being applied. In some embodiments, after applying the operational power level, the method 2000 returns to block 225. In this way, the one or more load managers can continually update and store operational power levels for any combination of loads of the plurality of loads. Further, the one or more load managers can dynamically monitor the input voltage of the lighting system in real time and adjust the power level of the plurality of loads even when the lighting system is damaged or not performing at its full capacity during operation.

Figure 3:
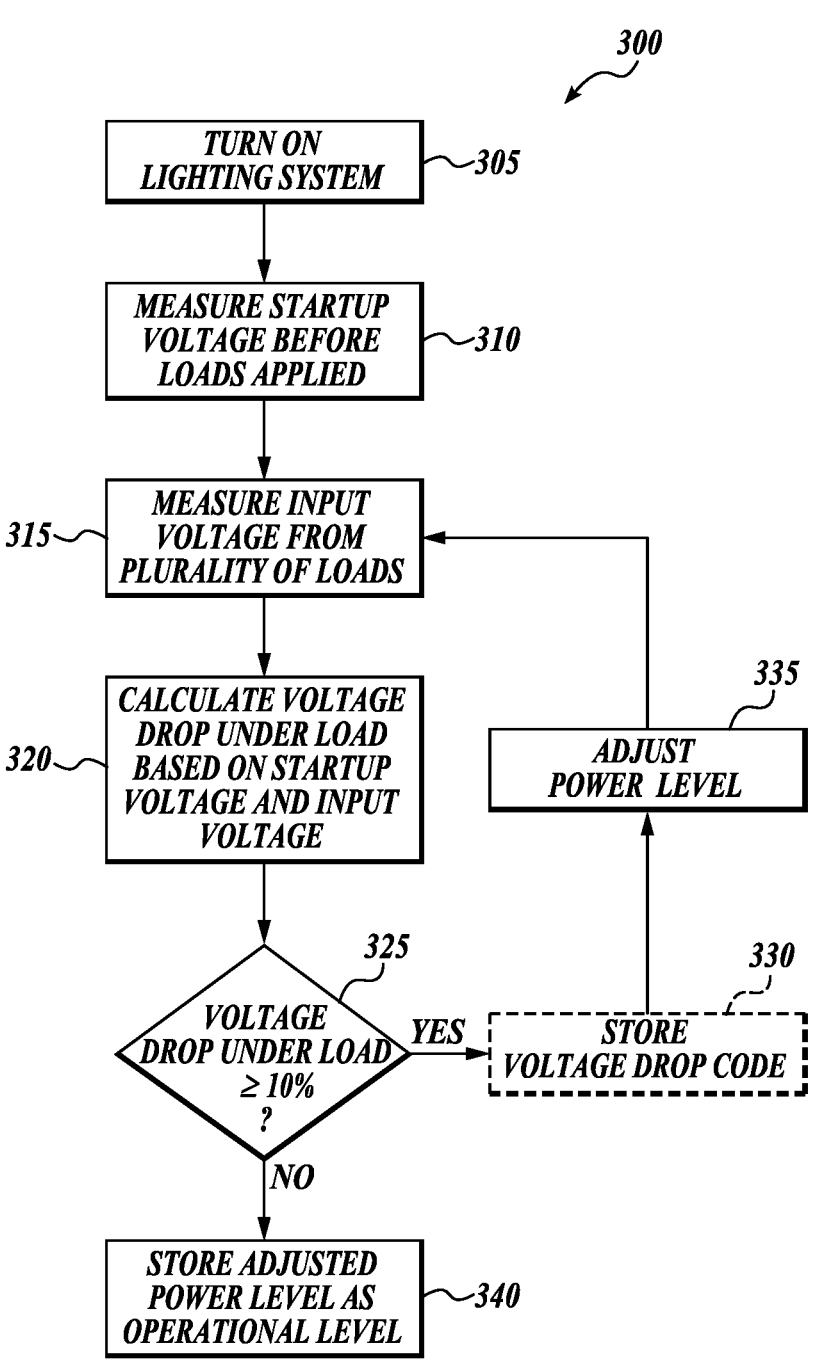
FIG. 3 is a method of dynamically managing a load of a lighting system based on voltage drop, in accordance with the present technology.

FIG. 3 is a method 300 of dynamically managing a load of a lighting system based on voltage drop, in accordance with the present technology.

In block 305, the lighting system is turned on. It should be understood that in some embodiments, block 305 is the same as or similar to block 220 of FIG. 2. In some embodiments, method 300 occurs sequentially after method 2000. In some embodiments, method 300 and method 2000 occur simultaneously. In some embodiments, method 300 represents a method for a lighting system distinct from that of method 2000. In some embodiments, the lighting system may be lighting system 200 of FIG. 1. In some embodiments, the lighting system is integrated with a vehicle, such as shown in FIG. 1. In some embodiments, the lighting system is turned on automatically with the vehicle. In some embodiments, the lighting system is turned on with manual input, such as by a user. In some embodiments, the lighting system is turned on independently of the vehicle.

In block 310, a startup voltage of the lighting system is measured before one or more loads of the plurality of loads is applied. In some embodiments, the startup voltage is the voltage of the lighting system before any load of the plurality of loads is applied. In some embodiments, the startup voltage is the voltage of the lighting system after a first one or more loads of the plurality of loads is applied, but before a second one or more loads of the plurality of loads is applied.

In block 315, the input voltage from the plurality of loads is measured. In some embodiments, the input voltage is determined based on a plurality of loads (such as plurality of loads 215A, 215B, 215C of FIG. 1). In some embodiments, one or more loads of the plurality of loads are turned on or applied when the input voltage is measured.

In block 320, a voltage drop under load is calculated based on the startup voltage and the input voltage. In some embodiments, the voltage drop under load is calculated by comparing the startup voltage and the input voltage. In some embodiments, the voltage drop under load is determined as a fraction or a percentage of the startup load and the input voltage.

In decision block 325, it is determined whether the voltage drop under load is greater than or equal to a voltage drop threshold, such as greater than or equal to 10%. In some embodiments, the voltage drop threshold may be any percentage, such as from about 2% to about 15%. In some embodiments, the voltage drop threshold may be informed by one or more regulations, the manufacturer of the lighting system or the vehicle, or a personal preference of a user of the lighting system or the vehicle. If the voltage drop under load exceeds or meets the voltage drop threshold (e.g., is greater than or equal to 10%), the method 300 proceeds to block 330.

Optionally, in block 330, the one or more load managers store a voltage drop code (or voltage drop flag). In some embodiments, the voltage drop code includes a time the voltage drop under load of the lighting system exceeded the voltage drop threshold, the percentage of voltage drop under load, the amount or percentage the voltage drop under load exceeded the voltage drop threshold, or a combination thereof. In some embodiments, the voltage drop code informs a servicer of the lighting system or vehicle that the voltage drop under load exceeded the voltage drop threshold. In some embodiments, the voltage drop code directs the servicer to repair a wire of the lighting system or vehicle, run a new conductor in the lighting system, or a combination thereof.

In block 335, the power level of the plurality of loads is adjusted. In some embodiments, the power level of the plurality of loads is a current, a drive, a battery consumption, an intensity, a brightness, or the like. In some embodiments, the power level of each load of the plurality of loads may be adjusted by the same amount, such as by 10 amps. In some embodiments, the power level of each load of the plurality of loads may be adjusted by the same proportion, such as by 10%. In some embodiments, the one or more load managers 205 may reduce the power level of each load of the plurality of loads based on which loads are actively turned on. It should be understood that the power level of the plurality of loads may be adjusted by any of the mechanisms described herein. The method 300 then returns to block 315, where the input voltage may be re-measured.

Returning to decision block 325, if the voltage drop under load does not exceed the voltage drop under load threshold (e.g., is not greater than or equal to 10%) the method 300 proceeds to block 340.

In block 340, the power level is stored as the operational power level. The operational power level may be defined as the consumption level of the plurality of loads that does not meet or exceed the voltage drop threshold. In some embodiments, the input voltage from the plurality of loads is continually measured, measured periodically, or measured each time a load of the plurality of loads is turned on (applied) or turned off. In this manner, the operational power level of the lighting system changes depending on how many loads of the plurality of loads are turned on. Further, the one or more load managers may store multiple operational power levels depending on the loads currently applied. For example, the one or more load managers may store a first operational power level of the lighting system when the HVAC system, scene lights, and warning lights are turned on, and a second operational power level of the lighting system when just the HVAC system is turned on. It should be understood that in some embodiments, the lighting system is restarted. Further, in some embodiments, the operational power level is automatically applied to the lighting system. In this way, the one or more load managers can continually update and store operational power levels for any combination of loads of the plurality of loads. Further, the one or more load managers can dynamically and in real-time monitor the input voltage of the lighting system and adjust the power level of the plurality of loads even when the lighting system is damaged or not performing at its full capacity in operation.

Figure 4:
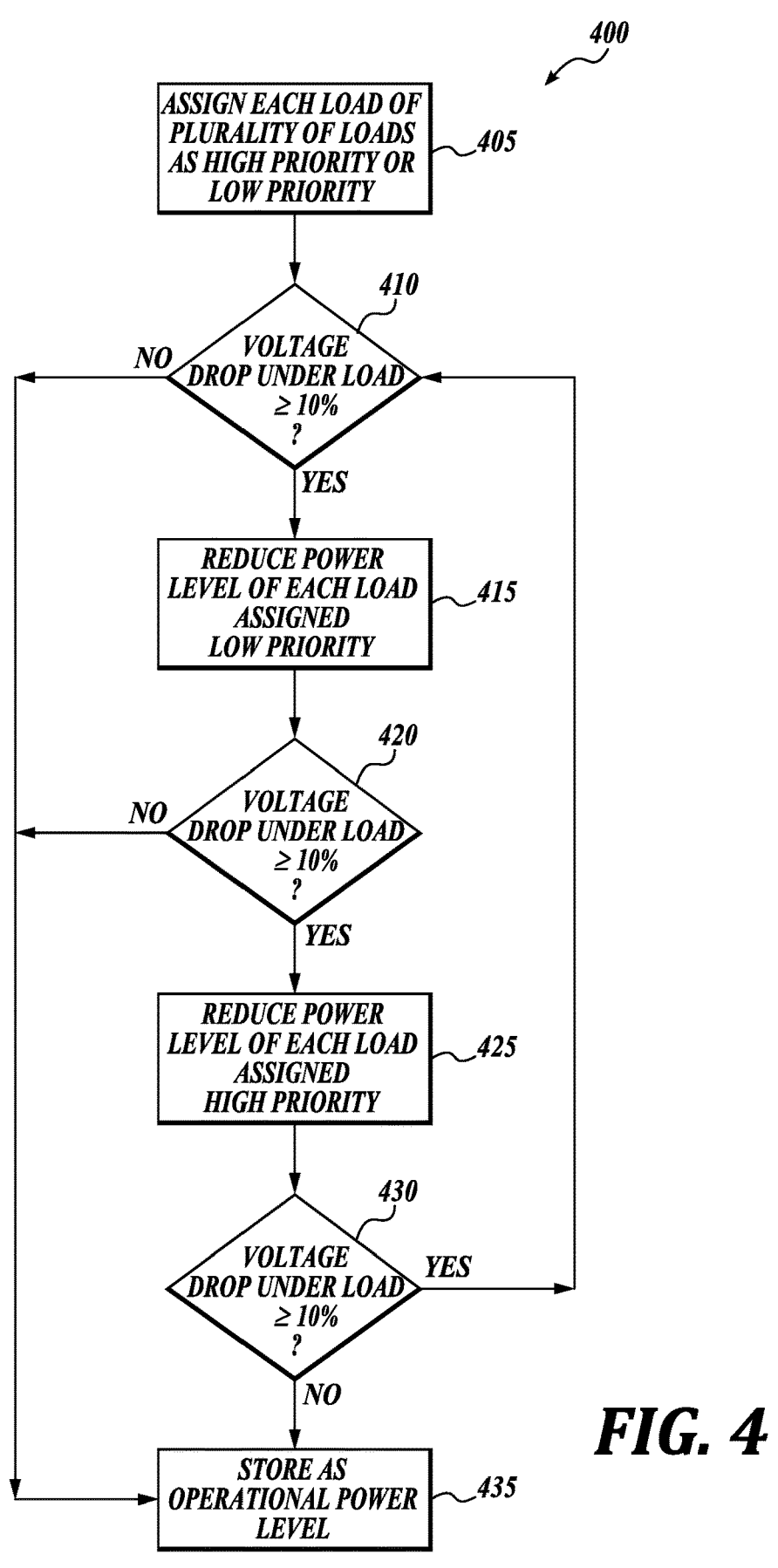
FIG. 4 is another method of dynamically managing a load of a lighting system based on voltage drop, in accordance with the present technology.

FIG. 4 is another method 400 of dynamically managing a load of a lighting system based on voltage drop, in accordance with the present technology. In some embodiments, the one or more load managers assign a priority to each load of the plurality of loads and adjusts and reduces the power level of each load based on its assigned priority. It should be understood that method 400 may be a subset of method 200 or method 300.

In block 405, each load of the plurality of loads may be assigned a priority level, such as high priority or low priority. In some embodiments, there may be additional priority assignments, such as a first priority, a second priority, a third priority, a last priority, and the like. In some embodiments, high priority (or first priority) consists of the loads that perform basic functions of the vehicle or lighting system. In some embodiments, the priority level is based on one or more regulatory requirements for the vehicle. In some embodiments, the priority level is based on NFPA regulatory requirements. In some embodiments, the priority level is based on user preference of a user of the vehicle or lighting system. In some embodiments, the one or more load managers groups the one or more loads into one or more priority groups. For example, in some embodiments, after assigning each load a priority level, the one or more load managers groups every load having a high priority into a high priority group, and every load having a low priority into a low priority group.

In decision block 410, it is determined whether the voltage drop under load is greater than or equal to a voltage drop threshold, such as greater than or equal to 10%. In some embodiments, decision block 410 occurs after block 320 in method 300. In some embodiments, decision block 410 is the same as or similar to decision block 325 in method 300. In some embodiments, the voltage drop threshold may be any percentage. In some embodiments, the voltage drop threshold may be informed by one or more regulations, the manufacturer of the lighting system or the vehicle, or a personal preference of a user of the lighting system or the vehicle. If the voltage drop under load exceeds or meets the voltage drop threshold (greater than or equal to 10%), the method 400 proceeds to block 415.

In block 415, the power level of each load assigned low priority (or lower priority) is reduced. In some embodiments, such as when each load is grouped into a priority level group, the power level of each load of a low priority group is reduced. In some embodiments, when the voltage drop under load exceeds the voltage drop threshold, the one or more load managers may reduce the power level of each load assigned a low priority by a larger percent (such as 10%) than the power level of each load assigned a higher or the highest priority.

In decision block 420, it is determined whether the voltage drop under load is greater than or equal to a voltage drop threshold, such as greater than or equal to 10%. If the voltage drop under load is greater than or equal to 10%, the method 400 proceeds to block 425.

In block 425, the power level of each load assigned a high priority (or higher priority) is reduced. In some embodiments, the one or more load managers may reduce the power level of each load assigned a low priority, measure the input voltage again, and only when the voltage drop under load still exceeds the voltage drop under load threshold, reduce the power level of each load assigned a high priority. In some embodiments, the power level of each load assigned a high priority may be reduced less than each load assigned to a lower priority, such as 5%. While only two priority levels are shown in method 400, it should be understood that this method could include any number of priority levels. In such embodiments, the power level of the plurality of loads with lower priority are reduced before the power level of the plurality of loads with higher priority, sequentially, for as many power levels as have been assigned to the plurality of loads. In decision block 430, it is determined whether the voltage drop under load is greater than or equal to a voltage drop threshold, such as greater than or equal to 10%. If the voltage drop under load is not greater than or equal to 10%, the method 400 proceeds to block 435.

In block 435, the adjusted power level is stored as an operational power level. In some embodiments, block 435 is the same as or similar to block 340 of method 300. The operational power level may be defined as the consumption level of the plurality of loads that does not meet or exceed the voltage drop threshold. In some embodiments, the input voltage from the plurality of loads is continually measured, measured periodically, or measured each time a load of the plurality of loads is turned on (applied) or turned off. In some embodiments, the operational power level may include an operational power level for each priority level group. For example, the one or more load managers may store a first power level for the high priority group, and a second power level for the low priority group.

Returning to decision block 410, if the voltage drop under load is not greater than or equal to 10%, the method 400 proceeds to block 435.

Returning to decision block 420, if the voltage drop under load is not greater than or equal to 10%, the method 400 proceeds to block 435.

Returning to decision block 430, if the voltage drop under load is greater than or equal to 10%, the method 400 returns to block 415.

FIG. 5 is another method 500 of dynamically managing a load of a lighting system based on voltage, in accordance with the present technology. In some embodiments, the one or more load managers assign a priority to each load of the plurality of loads and adjusts or reduces the power level of each load based on its assigned priority.

In block 505, each load of the plurality of loads are assigned a priority level, such as high priority or low priority. In some embodiments, there may be additional priority assignments, such as a first priority, a second priority, a third priority, a last priority, and the like. In some embodiments, high priority (or first priority) consists of the loads that perform basic functions of the vehicle or lighting system. In some embodiments, the priority level is based on one or more regulatory requirements for the vehicle. In some embodiments, the priority level is based on National Fire Protection Association (NFPA) regulatory requirements. In some embodiments, the priority level is based on user preference of a user of the vehicle or lighting system. In some embodiments, the one or more load managers group the one or more loads into one or more priority groups. For example, in some embodiments, after assigning each load a priority level, the one or more load managers group every load having a high priority into a high priority group, and every load having a low priority into a low priority group.

In decision block 510, it is determined whether the input voltage is below a minimum voltage of the lighting system. In some embodiments, the minimum voltage is predetermined by one or more regulations, the manufacturer of the lighting system or vehicle, or the personal preference of a user of the lighting system or vehicle. In some embodiments, the minimum voltage is hard coded into a one or more load managers (such as one or more load managers 205) or a controller (such as controller 210). In some embodiments, the minimum voltage is determined based on the capacity of a battery system, alternator system, or a combination thereof of the vehicle or lighting system. When the input voltage is below the minimum voltage threshold, the method 500 proceeds to block 515.

In block 515, the power level of each load assigned low priority (or last priority) is reduced. In some embodiments, such as when each load is grouped into a priority level group, the power level of each load of a low priority group is reduced. In some embodiments, the one or more load managers may reduce the power level of each load assigned a low priority by a larger percent (such as 10%) than the power level of each load assigned a higher or the highest priority.

In decision block 520, it is determined whether the input voltage is below a minimum voltage of the lighting system. If the input voltage is below the minimum voltage threshold, the method 500 proceeds to block 525.

In block 525, the power level of each load assigned a high priority is reduced. In some embodiments, the one or more load managers may reduce the power level of each load assigned a low priority, measure the input voltage again, and only when the voltage drop under load is below the minimum voltage threshold, reduce the power level of each load assigned a high priority. In some embodiments, the power level of each load assigned a high priority may be reduced less than each load assigned to a lower priority, such as 5%.

In decision block 530, it is determined whether the input voltage is below a minimum voltage of the lighting system.

If the input voltage is below the minimum voltage threshold, the method 500 proceeds to block 535.

In block 535, the adjusted power level is stored as an operational power level. In some embodiments, the operational power level may include an operational power level for each priority level group. For example, the one or more load managers may store a first operational power level for the high priority group, and a second operational power level for the low priority group.

Returning to decision block 510, if the voltage drop under load is not greater than or equal to 10%, the method 500 proceeds to block 535.

Returning to decision block 520, if the voltage drop under load is not greater than or equal to 10%, the method 500 proceeds to block 535.

Returning to decision block 530, if the voltage drop under load is greater than or equal to 10%, the method 500 returns to block 515.

Figure 6:
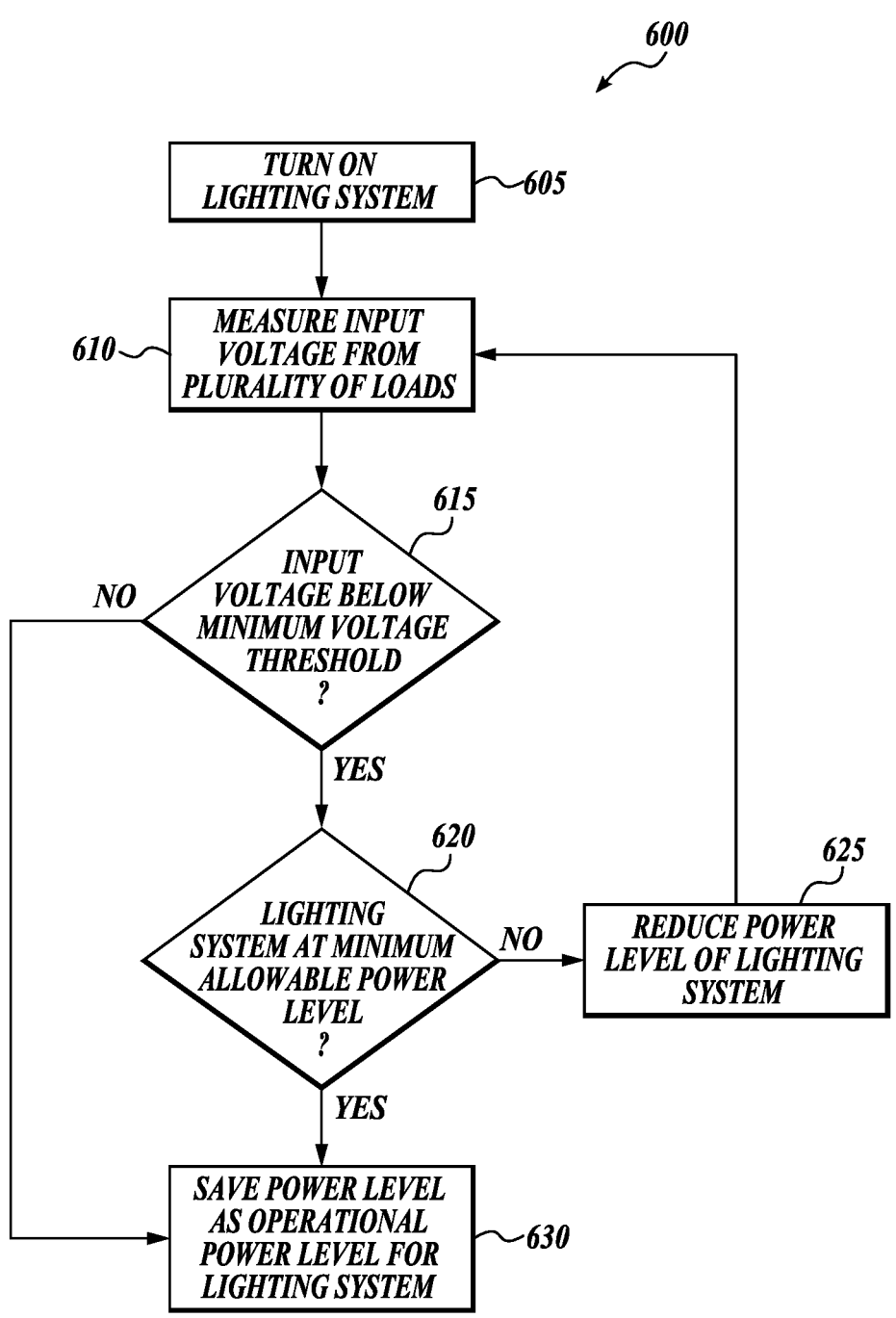
FIG. 6 is another method of dynamically managing a load of a lighting system based on voltage, in accordance with the present technology.

FIG. 6 is another method 600 of dynamically managing a load of a lighting system based on voltage, in accordance with the present technology.

In block 605, the lighting system is turned on. In some embodiments, the lighting system is lighting system 200 in FIG. 1.

In block 610, the input voltage from the plurality of loads is measured. In some embodiments, the input voltage is determined based on a plurality of loads (such as plurality of loads 215A, 215B, 215C of FIG. 1). In some embodiments, one or more loads of the plurality of loads are turned on or applied when the input voltage is measured.

In decision block 615, it is determined whether the input voltage is below a minimum voltage of the lighting system. If the input voltage is below the minimum voltage threshold, the method 600 proceeds to decision block 620.

In decision block 620, it is determined whether the lighting system is at a minimum allowable power. In some embodiments, the minimum allowable power is determined by NFPA regulations. In some embodiments, the minimum allowable power is determined by the manufacturer of the lighting system or the vehicle. In some embodiments, the minimum allowable power is determined by a user of the vehicle or the lighting system. In some embodiments, the minimum allowable power is hard-coded into the one or more load managers. If the input voltage is at a minimum allowable power, the method 600 proceeds to decision block 630.

In block 630, the adjusted power level is stored as an operational power level, as described herein.

Returning to decision block 615, if it is determined that the input voltage is above a minimum voltage threshold, the method 600 proceeds to block 630.

Returning to decision block 620, if it is determined that the lighting system is not at or below a minimum allowable power level, the method 600 proceeds to block 625.

In block 625, the power level of the lighting system, (i.e., the power level of one or more loads of the plurality of loads) is adjusted, as described herein.

It should be understood that all methods 200, 300, 400, 500, and 600 should be interpreted as merely representative. In some embodiments, process blocks of all methods 200, 300, 400, 500, and 600 may be performed simultaneously, sequentially, in a different order, or even omitted, without departing from the scope of this disclosure.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:
1. A load management system comprising:
one or more loads; and
one or more load managers electrically coupled to or embedded in the one or more loads, wherein each load manager of the one or more load managers comprises a microcontroller (MCU) having one or more data stores configured to store data, the MCU configured to:

sense an input voltage to the one or more of loads from a
vehicle;

determine whether the input voltage is below a minimum
voltage for the vehicle load management system with
the MCU, wherein the minimum voltage is based on a
capacity of an alternator of the vehicle, a battery system
of the vehicle, or a combination thereof;

when the input voltage is below the minimum voltage
threshold, adjust a power level, wherein the power level
is a power consumption of the one or more loads; and when the input voltage is above the minimum voltage,
store the power level as an operational power for the
vehicle load management system with one or more data
stores of the MCU.

2. The load management system of claim 1, wherein the
one or more loads are selected from warning lights, scene
lights, a heating, ventilation, and air conditioning (HVAC)
system, one or more headlights, one or more dome lights,
one or more compartment lights, one or more undercarriage
lights, one or more sirens, one or more radio chargers, or a
combination thereof.

3. The load management system of claim 1, wherein the
power level is reduced proportionally for each load of the
one or more loads by the MCU.

4. The load management system of claim 1, wherein the
power level is reduced by the same amount for each load of
the one or more loads by the MCU.

5. The load management system of claim 1, wherein the
MCU is further configured to apply the operational power
level to the vehicle load management system the next time
the vehicle load management system is turned on based on
the stored power level.

6. A load management system comprising:

one or more loads; and one or more load managers electrically coupled to or
embedded in the one or more loads, wherein each load
manager of the one or more load managers comprises
a microcontroller (MCU) having one or more data
stores configured to store data, wherein the MCU is
configured to:

sense a startup voltage of the vehicle load management
system, wherein the startup voltage is a voltage of the
vehicle load management system before the one or
more loads are applied;

calculate a voltage drop under load based on a difference
between the startup voltage and an input voltage under
load; and when the voltage drop under load is greater than or equal
to a voltage drop threshold, adjust a power level of the
one or more loads until the voltage drop under load is
less than the voltage drop threshold.

7. The load management system of claim 6, wherein the
one or more data stores of the MCU are further configured
to store a voltage drop code when the voltage drop under
load is greater than or equal to the voltage drop threshold,
wherein the voltage drop code informs a servicer of the
voltage-drop under load of greater than or equal to the
voltage drop threshold in the load management system.

8. The load management system of claim 7, wherein the
voltage drop code further directs the servicer to repair a
wire, a relay, a breaker, a fuse, an electrical component, or
a combination thereof of the vehicle load management
system, run a new conductor in the vehicle load management
system, or a combination thereof.

9. The load management system of claim 6, wherein the
one or more data stores of the MCU are further configured
to store the power level as the operational power level.

10. The load management system of claim 6, wherein
each load of the one or more loads is assigned a high priority
or a low priority, and wherein the one or more load managers
are further configured to, when the voltage drop under load
is greater than or equal to the voltage drop threshold, reduce
the power level of each load of the one or more loads
assigned a low priority before adjusting the power level of
each load of the one or more loads assigned a high priority.

11. The load management system of claim 10, wherein the
one or more load managers are further configured to, when
the input voltage is below the minimum voltage threshold,
reduce the power level of each load of the one or more loads
assigned a low priority before adjusting the power level of
each load of the one or more loads assigned a high priority.

12. A method of dynamically managing loads having a
microcontroller (MCU) with one or more data stores con-
figured for storing data, the method comprising:

receiving a sensed input voltage to one or more loads on
the vehicle when the vehicle is turned on and at least
one load of the one or more loads is applied with an
MCU of each load manager of the one or more load
managers;

determining whether the input voltage is below a mini-
mum voltage for the vehicle with the MCU;

when the input voltage is below the minimum voltage
threshold, reducing a power level of the vehicle with
the MCU; and when the input voltage is above a minimum voltage,
storing the power level as an operational power level
for the vehicle with the one or more data stores of the
MCU.

13. The method of claim 12, wherein the power level is
reduced proportionally for each load of the one or more
loads.

14. The method of claim 12, wherein the power level is
reduced by the same amount for each load of the one or more
loads.

15. The method of claim 12, wherein the method further
comprises applying the operational power level to the
vehicle the next time the vehicle is turned on.

16. The method of claim 12, wherein the method further
comprises:

receiving a startup voltage of the vehicle from a battery of
the vehicle with the MCU, wherein the startup voltage
is a voltage of the vehicle before at least one load of the
one or more loads are applied;

calculating a voltage drop under load based on the dif-
ference between the startup voltage and the input
voltage with the MCU; and when the voltage drop under load is greater than or equal
to the voltage drop threshold, adjusting the power level
of the one or more loads until the voltage drop under
load is less than voltage drop threshold with the MCU.

17. The method of claim 16, wherein the method further
comprises storing a voltage-drop code when the voltage
drop under load is greater than or equal to the voltage drop
threshold with the one or more data stores of the MCU.

18. The method of claim 16, wherein the method further
comprises storing the power level as the operational power
level.

19. The method of claim 16, wherein the method further
comprises assigning each load of the one or more loads a
high priority or a low priority.

20. The method of claim 19, wherein the method further
comprises, when the voltage drop under load is greater than
or equal to the voltage drop threshold, reducing the power
level of each load of the one or more loads assigned a low priority before adjusting the power level of each load of the one or more loads assigned a high priority with the MCU.

* * * * *